US012073514B2

(12) United States Patent
Yerli (10) Patent No.: US 12,073,514 B2
(45) Date of Patent: Aug. 27, 2024

(54) MATCHMAKING SYSTEM AND METHOD FOR A VIRTUAL EVENT

(71) Applicant: TMRW Foundation IP S. À R.L., Luxembourg (LU)

(72) Inventor: Cevat Yerli, Dubai (AE)

(73) Assignee: TMRW FOUNDATION IP S. À R.L., Luxembourg (LU)

( * ) Notice: Subject to any disclaimer, the term of this patent is extended or adjusted under 35 U.S.C. 154(b) by 87 days.

(21) Appl. No.: 18/059,279

(22) Filed: Nov. 28, 2022

(65) Prior Publication Data

US 2024/0177423 A1 May 30, 2024

(51) Int. Cl.
*G06T 19/00* (2011.01)
*G06T 11/00* (2006.01)
*H04L 65/403* (2022.01)

(52) U.S. Cl.
CPC .............. *G06T 19/00* (2013.01); *G06T 11/00* (2013.01); *G06T 2200/24* (2013.01); *G06T 2219/024* (2013.01); *H04L 65/403* (2013.01)

(58) Field of Classification Search
None
See application file for complete search history.

(56) References Cited

U.S. PATENT DOCUMENTS

| | | | |
|---|---|---|---|
| 11,032,328 B1 | 6/2021 | Little et al. | |
| 2009/0216835 A1* | 8/2009 | Jain | G06Q 10/10 709/204 |
| 2011/0072367 A1* | 3/2011 | Bauer | G06F 3/04815 715/757 |
| 2017/0093967 A1* | 3/2017 | Grosz | H04L 67/53 |
| 2022/0321370 A1* | 10/2022 | Skuratowicz | H04L 12/1822 |
| 2022/0407731 A1* | 12/2022 | Jenkins | H04L 12/1827 |

* cited by examiner

*Primary Examiner* — Frank S Chen
(74) *Attorney, Agent, or Firm* — Bryan Cave Leighton Paisner LLP (57) ABSTRACT

A matchmaking system and method for a virtual event. The system comprises a registration module linked to the virtual environment having registration data of participants of the virtual event. A grouping unit matches the participants in different groups based on matching criteria of the participants. A location in the virtual event and metadata for each group is generated based on the matching criteria. An instance of the virtual event is assigned to each group. Each participant is invited to join the matched group. The invitation comprises at least a portion of the metadata of the matched group. Each participant joining the group is granted membership and access to the matched group. The joined participants can communicate with other members of the matched group.

20 Claims, 8 Drawing Sheets

MATCHMAKING SYSTEM AND METHOD FOR A VIRTUAL EVENT

FIELD

The present disclosure relates to computer systems and methods. In particular, the present disclosure relates to a system and method enabling matching participants of a virtual event up into different groups.

BACKGROUND

The attending of large exhibitions or virtual events has become increasingly popular. There are several advantages in attending a virtual event. The participants do not actually have to be physically present at the virtual event and therefore do not have to travel to where the event is held. The participants can attend the virtual event for example an international conference in the comfort of their own home or office. This of course has a lot of cost and time saving implications. These virtual events can be attended by participants from all over the world. One of the disadvantages of these virtual events is that they do not really provide the participants with the chance to meet and mingle with each other individually. There is little or no possibility for meeting people with similar interests, making it difficult to achieve good networking. These virtual events are attended by participants that are generally strangers to each other. In general, these virtual events do not give the participants the opportunity to network and build up new business or other relations with each other.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In at least one aspect of the current disclosure, a matchmaking system for virtual events is provided. A computer system comprises one or more computing devices having at least one processor and memory storing registration data of participants of the virtual event hosted in a virtual environment, the registration data comprising one or more matching criteria. The computer system is programmed to perform steps comprising matching the participants into different matched groups based on the matching criteria; generating a location in the virtual event and metadata for each of the matched groups based on the matching criteria; assigning an instance of the virtual event to a first matched group; sending invitations to join the matched group, wherein the invitations comprise a portion of the metadata of the first matched group; and, in response to participants accepting the invitations to join the first matched group, granting the participants joining the first matched group membership and access to the first matched group to enable the joined participants to communicate with other members in the first matched group.

In some embodiments, the access that is granted to the participant joining the group comprises enabling audio and video access. The one or more computing devices may be included in a server computer system. In some embodiments, the first matched group can contact other matched groups. The matching of participants into matched groups may be implemented by machine learning algorithms. The metadata of the first matched group may comprise the matching criteria for the first matched group. The matching criteria of the first matched group may comprise at least one of a topic criterion, a betting criterion, a game choice, a media interest, a social relationship, a brand interest, or an age group. The matching criteria for the first matched group may comprise a location and distance between participants (e.g., in the real world) in the first matched group.

In some embodiments, one or more properties of the scene in the virtual event of each matching group may be customized to match at least one of the matching criteria. The properties of the scene in the virtual environment may comprise the visual design of the selected location, the audio of the selected area, applications available in the location of the virtual environment, or a combination thereof.

In some embodiments, the computer system is further programmed to enable users to search for relevant groups, e.g., by connecting to a search engine enabling users to search for relevant groups based on matching criteria.

In some embodiments, the virtual environment is a 3D virtual environment, and participants are represented within the 3D virtual environment as camera-generated user graphical representations of themselves. In other embodiments, the virtual event may be a 2D virtual event, and participants are represented within a 2D virtual environment as avatars that, when selected (e.g., clicked on), spawn a video conference enabling communication with other participants.

In some embodiments, the computer system is further programmed to position matched participants of the first matched group in the virtual environment at a distance from one another that is based on a matching relevance score, such by positioning participants closer to one another (e.g., at a virtual conference table or in a virtual lecture hall or virtual networking reception) based on a higher matching relevance score and farther away from each other based on a lower matching relevance score.

In some embodiments, the virtual event comprises a speaker queue. In such embodiments, the participants may regulate communication with each other with the use of the speaker queue.

The current speaker may be displayed in the instance of the virtual event. Each participant may have a client device that connects to the virtual event through a browser or conferencing application via a network. An instance of the virtual event may be displayed on the client device. An instance of the virtual event may have a scene, and it may be possible to navigate in the scene.

In another aspect of the current disclosure, a matchmaking system for virtual events is provided. The matchmaking system comprises a remote computer system comprising one or more computing devices having at least one processor and memory storing registration data of participants of a virtual event hosted in a virtual environment, the registration data comprising matching criteria, the computer system being programmed to perform steps comprising assigning at least one of the matching criteria to each of a plurality of locations in the virtual event; matching the participants to a matched location of the plurality of locations in the virtual event based on the matching criteria; assigning an instance of the virtual event to the matched location based on the matching criteria; sending invitations to the matched participants to join the matched location, wherein the invitations comprise at least a part of the metadata of the matched location; and, in response to the participants accepting the invitations to join the matched location, granting the participants joining the matched location access to the matched location of the virtual event, spawning joined participants directly in the matched location; and enabling joined participants to communicate with other participants in the matched location.

In another aspect of the current disclosure, a method performed by computer system comprises registering registration data of participants of a virtual event in a registration module linked to a virtual environment, the registration data of participants of the virtual event comprising one or more matching criteria; matching the participants into different matched groups based on the matching criteria; generating a location in the virtual event and metadata for each matched group based on the matching criteria; assigning an instance of the virtual event to a first matched group; sending invitations to join the first matched group; in response to participants accepting the invitations to join the first matched group, granting the participants joining the first matched group membership and access to the first matched group to enable the joined participants to communicate with other members in the first matched group.

In some embodiments, the metadata of the first matched group comprises the matching criteria of the first matched group, which may include topic criteria, betting criteria, game choices, media interests, social relationships, brand interests, age groups, or other matching criteria.

In some embodiments, the matching criteria for the first matched group comprises distance in the real world between participants in the first matched group.

Non-transitory computer-readable media (e.g., memory or physical storage media) including computer executable instructions for performing such methods or other methods described herein are also described.

BRIEF DESCRIPTION OF THE DRAWINGS

Specific features, aspects and advantages of the present disclosure will be better understood with regard to the following description and accompanying drawings, where.

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

Systems and methods for matchmaking for virtual events are described. In described embodiments, a computer system is programmed to perform steps comprising matching participants into different matched groups based on the matching criteria; generating a location in a virtual event and metadata for each of the matched groups based on the matching criteria; assigning instance of virtual events to matched groups; sending invitations to join the matched groups; and, in response to participants accepting such invitations, granting the participants joining the matched groups membership and access to the matched groups to enable the joined participants to communicate with other members in the matched groups. Further details of such embodiments and other embodiments are described below.

Figure 1:
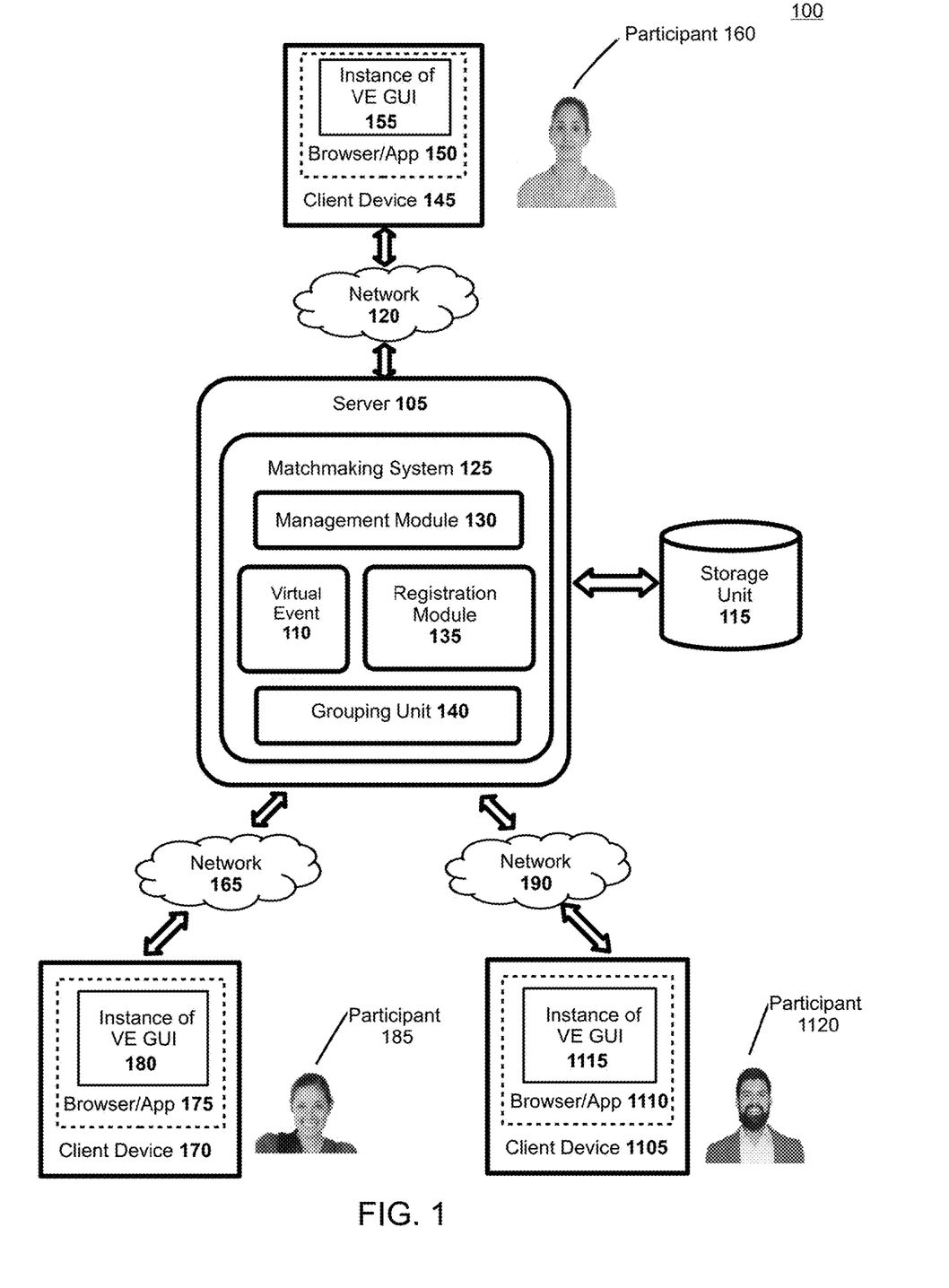
FIG. 1 is a block diagram of a matchmaking system for a virtual event according to an embodiment.

FIG. 1 shows a diagram of a system 100 for hosting a virtual event. A remote computing device, in this case server 105 which has at least one processor and memory (not shown), comprises matchmaking system 125 storing a virtual event 110, a management module 130, a registration module 135 and a grouping unit 140. The virtual event 110 is hosted on a virtual environment, which may be any of a 2D or 3D virtual environment including corresponding graphical elements where the virtual event takes place. The registration module 135 captures registration data of participants who want to attend the virtual event 110 when the participants register for the virtual event 110. The registration data includes the profile information of the participants. This can include the participant's name, a photo, a thumbnail, address, nationality, language, age, sex, qualifications, career, field of research, hobbies, sport interest, a team the participant supports, or any other interests of the participant. The registration module 135 is linked to the virtual event 110.

The participants are then matched up according to certain matching criteria (not shown), which are included in or may be inferred from the registration data of the participants. In some embodiments, the matching criteria depend on the nature or type of the virtual event. For example, if the virtual event 110 is a sporting event the matching criteria may include the team the participant supports. If the virtual event 110 is a lecture in electronics, the matching criteria may include the field of research of the participant and/or the company the participant works for. If the virtual event 110 is an art exhibition, the matching criteria may include the particular art style of interest of the participant, such as abstract, impressionism, modernism, cubism, surrealism or contemporary art. The matching criteria may also include the age group of the participants.

Further examples of matching criteria are betting criteria, such as for betting games in a casino, a car or horse race or on a sporting event. Further, the maximum amount of money that the participant bets can also be included in the matching criteria.

Another example would be the sort of game the participant prefers. Examples can include card games like bridge, chess or bingo. Media interests can also serve as matching criteria. This can include newspapers, magazines, radio or television. Further examples of matching criteria are social relationships such as family ties, members of a school or university members of a sporting club. Brand interests can also be matching criteria. Examples include cars where the brands can be MERCEDES, BMW or VOLKSWAGEN. Other brands can be in the field of fashion such as GUCCI or CARTIER.

The matchmaking system 125 also has a grouping unit 140. The grouping unit 140 matches the participants into different matched groups based on the matching criteria. In some embodiments, these different groups are initially created based on matching criteria without participants, which can allow groups to be created even if there are initially no participants that comply with the matching criteria for those groups. The grouping unit 140 then generates a location in the virtual environment hosting the virtual event 110 as well as metadata for each group based on the matching criteria. In some embodiments, the grouping unit 140 initially looks for a location in the virtual environment that has some relation with the matching criteria, such as with the topic of the virtual event. If no relation can be found, the grouping unit 140 selects a location in some other way (e.g., randomly or in a pre-determined pattern) in the virtual environment and reserves the location for that specific group so that the same location is not provided to other groups.

For example, in a conference about film-making, if the matching criteria is an indicated interest in science fiction films, and there is a location such as a specific room/table/area reserved to science fiction, then the grouping unit 140 first identifies the science fiction location and then puts the participants with an interest in science fiction in that location. If there is no location such as a specific room/table/area reserved for science fiction, then the grouping unit 140 selects some other available location (e.g., a random location) of the virtual environment. It then identifies that selected location (such as a virtual room/table/area) as being reserved for participants with an interest in science fiction films and starts placing participants with matching interests in that location.

The grouping unit 140 then assigns an instance of the virtual event 110 to each group. The term "instance" refers to a specific and independent implementation of a videoconferencing session comprising the videoconferencing space (e.g., of a 2D or 3D virtual environment representing such a video conferencing space) plus one or more corresponding communication channels that enable communications within the videoconferencing space. An instance of a virtual event 110 is, for example, a virtual event 110 implemented in a videoconferencing session in a 2D or 3D virtual environment, wherein audio commentary is provided in English for the case of a sporting event like soccer where the participant is English speaking. Another example of an instance is a virtual event with audio commentary in German for a German speaking participant. In one embodiment, the instance is provided based on the physical geolocation of the participant. For example, if the English speaking participant is located in England, the created instance will receive and provide advertisements of goods and services in England in the English language. Likewise, if the German speaking participant is located in Germany, he or she would receive advertisements of goods and services in Germany in the German language. In similar fashion, if the virtual event 110 is an art exhibition and the participant's interest in art is impressionism, the instance of the virtual event 110 that will be shown to the participant will include impressionist art. By taking into account the physical geolocation of the participant, the grouping unit 140 therefore considers the location and distance of the other participants from each other to perform the matchmaking.

The grouping unit 140 can be implemented, for example, by using machine learning algorithms to improve grouping of participants beyond strict matching of interests or demographics or selection of appropriate locations in a virtual environment for particular groups. In an illustrative scenario, participants may be asked to complete surveys indicating whether they enjoyed the virtual location or their interactions with the participants in their group. In another illustrative scenario, the system may automatically collect information that indicates a successful grouping, such as the duration or frequency of interactions between participants in the groups. Levels of interaction or participant satisfaction may be associated with scoring metrics. Machine learning algorithms may take such metrics into account and identify patterns that increase levels of interaction or expected levels of participant satisfaction, based on the matching criteria. Possible machine learning approaches included supervised learning, unsupervised learning, and reinforcement learning approaches.

The grouping unit 140 then invites participants to join the group to which the participants have been matched, e.g., by sending invitations (e.g., as uniform resource locators (URLs) to the participants' client devices. In some embodiments, the invitation comprises at least a portion of the metadata of the matched group. This metadata includes, in the case of a sporting event, for example, the team the group supports and the location of the participants and distance from other participants the group is trying to acquire. In the case that the virtual event 110 is an art exhibition, the metadata can include the art style that is related to the group as well as the age of the participants the group is trying to acquire. In other embodiments, the metadata is not sent with the invitation.

On the other hand, if the virtual event 110 is a lecture in electronics, the metadata may include information about the specific interests or activities of the group, such as data showing their interest in radar, or signal processing, or power electronics.

In response to the participant accepting the invitation to join the group (e.g., by the participant clicking or tapping or otherwise activating a hyperlink in the invitation), the grouping unit 140 grants each participant accepting the invitation to join the group membership and access to the matched group. The participants who have joined the group are able to communicate with other members in the matched group. This communication can be by video, audio, text chatting, or the like.

The virtual environment for each group can be customized (e.g., based on topic or interest) for each group based on the virtual event 110. For example, in a sports conference including many sports, a group that is mainly interested in soccer can have their instance-dependent virtual environment decorated with soccer-related ornaments. In the case of a group interested in impressionist paintings, the virtual environment can be decorated with portraits of impressionist painters. Similarly in the case of a group interested in power electronics, the virtual environment can be decorated with images of power semiconductors.

In some embodiments, the matchmaking system 125, through the grouping unit 140, is further programmed to position matched participants of a matched group closer to each other based on a higher matching relevance score, and to position matched participants of the first matched group farther to each other based on a lower matching relevance score. The matching relevance score refers herein to a score that is computed by the matchmaking system 125 based on the matching criteria, providing a higher matching relevance to participants with more similar interests, or with a higher interest in a few selected categories of matching criteria, and/or the like; and a lower score to participants with fewer similar interests or with a lower interest in a few selected categories of matching criteria, and/or the like. The particular techniques used to calculate such relevance scores may vary depending on implementation, known techniques for calculating distance metrics or similarity measures.

FIG. 1 shows participants 160, 185, and 1120 of virtual event 110. Participant 160 has client device 145, participant 185 has client device 170 participant 1120 has client device 1105. Client devices may comprise any form of end user devices including desktop/laptop computers, personal computers (PCs), smartphones, tablet computers, wearable devices such as smartwatches; head-mounted displays for providing VR/AR experiences; smart contact lenses, and the like.

As shown in FIG. 1, each of the client devices 145, 170, and 1105 connect to the virtual event 110 through a browser or conferencing application (app) 150, 175, 1110. In the browser or conferencing application 150, 175, 1110 an instance of the virtual event (VE) 110 is displayed. This instance of the virtual event 110 also provides a graphical user interface (GUI) through which the participants 160, 185, and 1120 interact with virtual event 110. These instances of virtual event also provide graphic user interfaces 155, 180, and 1115.

Each client device 145, 170, and 1105 is connected to server 105 with networks 120, 165 and 190. These networks can be the internet, a wide area network (WAN) or even a local area network (LAN) or anything else that can connect a client device with the server.

The management module 130 is configured to synchronize the virtual event 110 with the instance of the virtual event graphical user interface (GUI) (155, 180, and 1115) of client devices 145, 170, and 1105 respectively. Such a synchronization is important because, as the grouping unit 140 assigns an instance of the virtual event 110 to each group, each matched group can have its own characteristics and communication channels while the event remains the same for all instances, which can potentially desynchronize the instances from the original event. In some embodiments, the management module 130 synchronizes one or more of event time, movements of participants in the virtual environment, audio, video, and/or other characteristics of the event and its various instances. The management module 130 thus ensures a synchronization that the event is transmitted as faithfully as possible to client devices 145.

Figure 2:
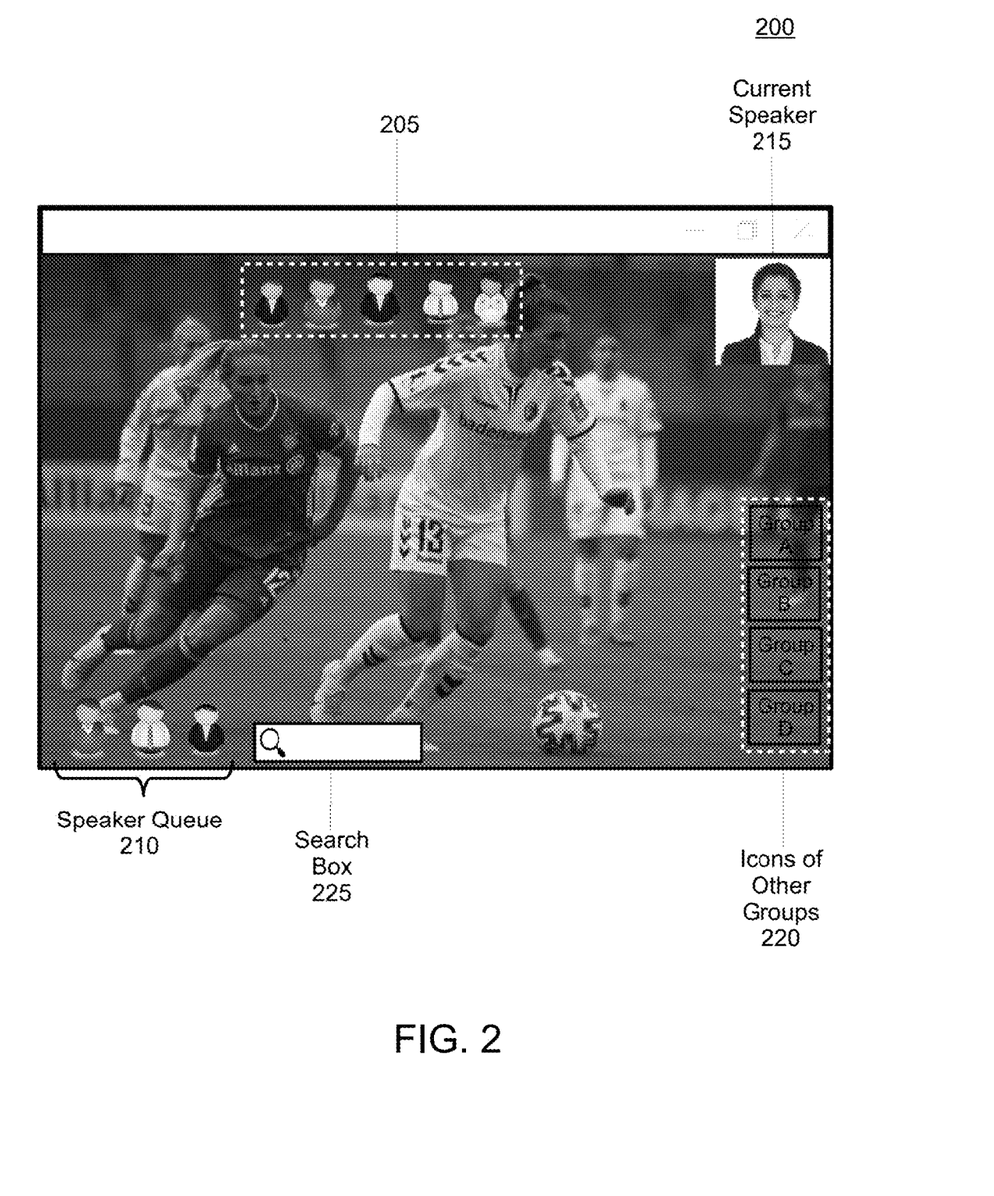
FIG. 2 is a screenshot diagram of an instance of a virtual event Graphical User Interface (GUI) in the context of a soccer match.

FIG. 2 shows an instance of a virtual event GUI of a soccer match as mentioned above (155, 180, and 1115) indicated in general by 200. As can be seen in FIG. 2, the scene is that of a soccer match between two soccer teams being broadcast into an instance of a videoconferencing environment that enables communication between members of a matched group watching the soccer match. The scene may be an instance of the virtual event that is created for a group having the matching criteria for participants that are supporters of a particular side. The matching criteria may also include the geolocation and age group of the participants. The instance of the virtual event may, in some scenarios, have commentary in the language related to the group and advertisements for services and products that are related to the location and the age group that will apply to them.

The participants that have joined the group are now members of the group. Shown at the top and in the middle of the scene are the participant identifiers (e.g., icons, avatars, or thumbnail images) of the members that joined the group 205. These members are able to communicate with each other. The available modes of communication may vary based on group size or other factors. In one illustrative scenario, when the group is small (e.g., 2 to 5 participants) the participants are able to communicate freely and at the same time. In some embodiments, when a member wants to communicate to a specific member of the group without the other members hearing he or she can click on or otherwise select the identifier of the member to open up a private communication channel.

In some scenarios, members may wish to regulate communication within the group with a speaker queue 210. For example, if too many members want to talk at the same time, it may be that the members of the group can no longer communicate effectively. To overcome this, the members of the group may decide to regulate communication between them with the use of a speaker queue 210. In some embodiments, the speaker queue 210 allows only one member of the group to talk at a certain time. If a member wants a chance to speak, he or she would, for example, click on an icon provided for in the scene or press a button so allocated on his keyboard. If someone else is speaking, that participant is placed in the back of the speaker queue 210. Once the person that was speaking finishes, the next person in line in of the speaker queue 210 is given a chance to speak. He or she is then removed from the speaking queue 210 and all the other members in the speaking queue move up one space towards the front of the queue.

As a further feature depicted in FIG. 2, the video image of the current speaker 215 is displayed in the upper right hand corner. On the lower right hand side are icons of the other groups 220. These icons can be used by the current group members to contact the other groups. Each of the other groups also have icons of the remaining groups that form part of the virtual event. In this manner all the groups at the virtual event can use these symbolic graphical representations or icons to contact each other.

Also shown in FIG. 2 towards the bottom center is a search box 225. The search box 225 allows members of the group, via the grouping unit, to connect to a search engine enabling members of the group to search for relevant groups. Search results may be based, for example, on matching criteria of the current group or the participant that is performing the search. This can be useful when one or more members of the group, for example, want to change groups to talk with people using other matching criteria keywords relevant to them, such as to search for people speaking another language, or in another geographic zone, or who support another team. The results of matching groups can be shown on a separate window or on the same window overlapping a portion of it. A participant may then select a new group of interest and request permission from a group host or administrator to join that group.

Figure 3:
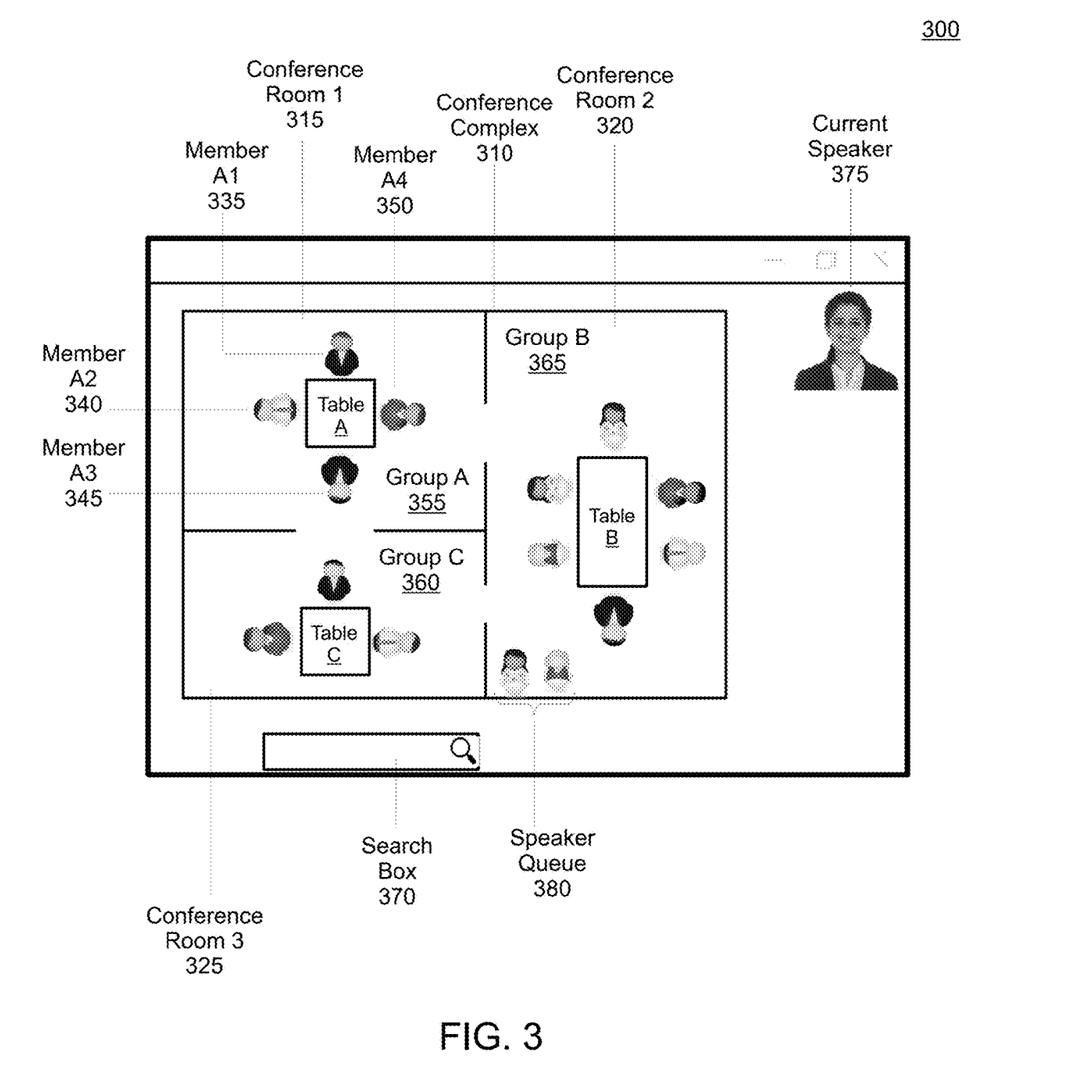
FIG. 3 is a screenshot diagram of another instance of a virtual event GUI in the context of a conference room complex.

FIG. 3 shows another instance of a virtual event GUI 300 having the scene of a conference complex 310. In FIG. 3, the virtual event is a 2D virtual event wherein participants or members of the group are represented within the 2D virtual environment as thumbnails or avatars which, when clicked upon, spawn a video conference enabling communication with other participants or members of the group.

Conference complex 310 has conference room 1 315, conference room 2 320 and conference room 3 325. Conference room 1 315 has group A 355. Group A 355 has table A surrounded by four members: member A1 335, member A2 340, member A3 345, and member A4 350. Conference room 2 320 has group B 365. Group B 365 has table B surrounded by six members. Group C 360 has table C surrounded by three members. The members of each group can communicate audio-visually with each other. The members of a group cannot hear what the other group members or saying to each other, as the event and virtual environment instances and corresponding communication instances are independent. In general, the group members can talk simultaneously.

In the case of group A 355, if member A1 335 wants to say something in confidence to member A3 345, member A1 335 may then click on the icon of member A3 345. If group A 355 wants to contact group B 365 as a group they would click on table B. Similarly, if group C 360 wants to contact group A 355 as a group, they may then click on table A. If group C 365 invites member A2 340 of group A 355 and he or she accepts their invitation, member A2 340 can join group C 360 by moving his icon to group C 360 next to table C. Member A2 340 will then be able to communicate with all the members of group C 360, and will no longer be able to communicate with the members of Group A 355. The members of a group can decide to regulate communication between them, especially a large group B 365. They can do so with the use of a speaker queue 380 as discussed with reference to FIG. 2. The current speaker is then displayed as current speaker 375 as shown in the top right corner. Also shown in FIG. 3 towards the bottom left is a search box 370. This allows members of a group as discussed with reference to FIG. 2, via the grouping unit, to connect to a search engine enabling members of the group to search for relevant groups based on matching criteria.

Figure 4:
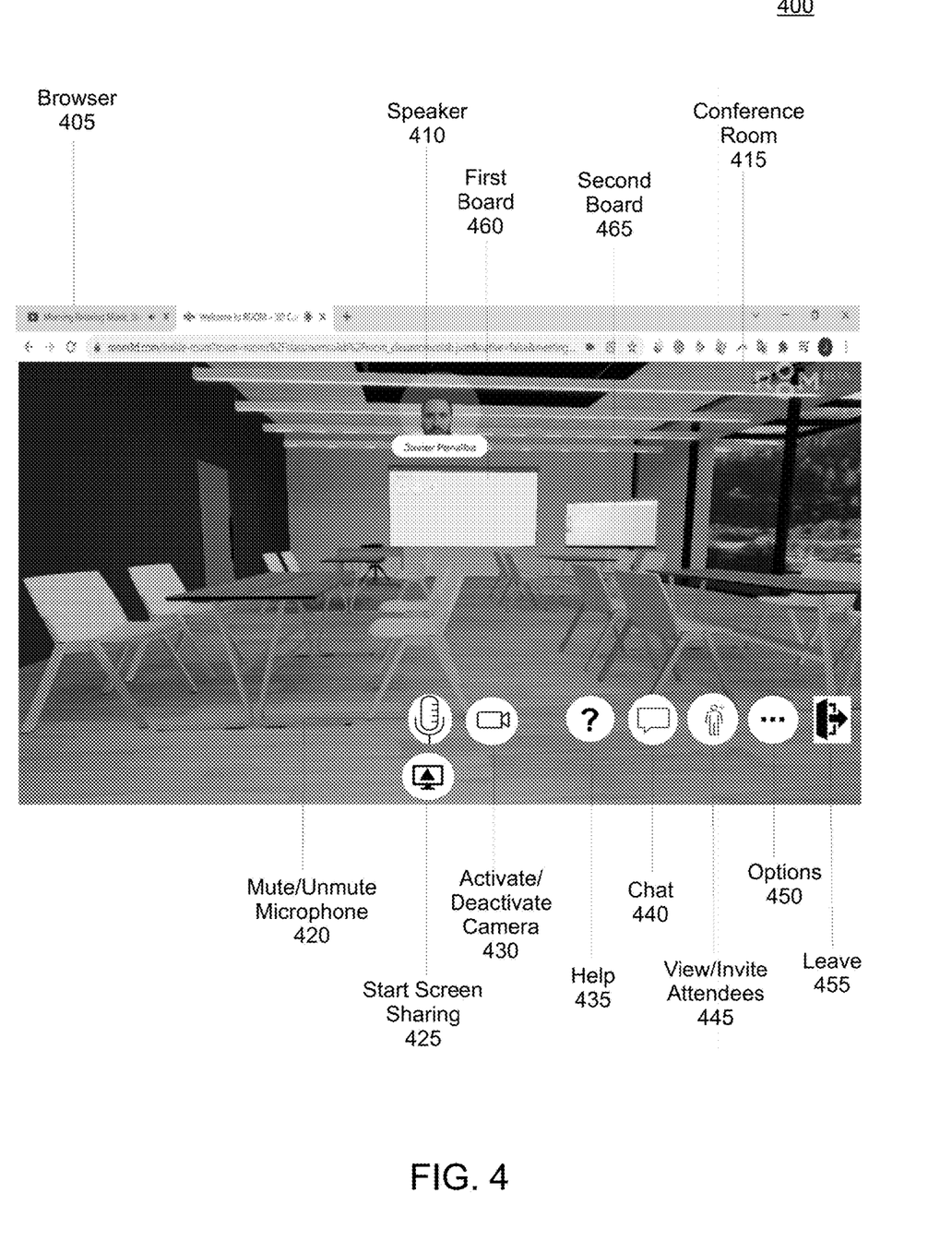
FIG. 4 is a screenshot diagram of another instance of a virtual event GUI in the context of a lecture room.

FIG. 4 shows another instance of a virtual event GUI 400 having the scene of a lecture room 415, wherein the virtual event is hosted on a 3D virtual environment.

The scene of the lecture room 415 is displayed in browser 405. Further shown in FIG. 4 is a lecturer or speaker 410 which has at his disposal a first board 460 and a second board 465. These boards can be used by the speaker 410 to display information that can assist in the presentation of the lecture. Lecture room 415 has four tables with four chairs each. These chairs can be occupied by participants of the virtual event. Each table with four chairs can form a group as discussed above. This means that the members of the group can communicate with each other, but they cannot hear what the other groups at the other tables are speaking about. It is also possible to navigate by panning (looking left and right) and tilting (looking up and down) the view by clicking on the background of the lecture scene and moving the mouse.

In some embodiments, the VE GUI 400 also enables users to navigate the virtual environment by moving around in the scene by any suitable means, such as by pressing one or more keys from the keyboard and using the arrow keys of the keyboard. While a user walks in the virtual environment, a user graphical representation will be moving through the scene, experiencing a first-person view that may be viewable by other users while the moving user displaces himself. It is also possible to sit in a chair by clicking on the chair, enabling the sitting user to have the view of the scene as though he or she is sitting in the chair. The participant of the event or the members of a group therefore experience a 3D immersive effect in the virtual environment of the lecture room.

Towards the bottom of the scene are several icons that can be used by the members or participants of the lecture. Firstly, there is the mute/unmute microphone 420 icon with which a member can mute or unmute his or her microphone. Below the mute/unmute microphone 420 icon is a start screen sharing 425 icon that can be used by two or more participants or members of a group or participants to share a screen. An activate/deactivate camera 430 icon on the right side of the icon 420 can be used by a participant or a member of a group to activate or deactivate his or her camera. This allows a member or participant to be either visible or not visible to the rest of the participants and members.

There is also provided a help 435 icon enabling a participant or member of a group to obtain further help should the need arise. Also shown in FIG. 4 is a chat 440 icon that can be used to type a message that can be exchanged between the members of the group or other participants. A view/invite attendees 445 icon is provided which is used to view the current attendees (members of the group or other participants in the virtual event) and also to invite other attendees to the group. The options 450 icon provides for a selection of a full screen display, device settings, or to report a problem. The last icon at the bottom right, leave 455, provides for the option for a member of a group or a participant to leave the scene of the virtual environment.

Figure 5:
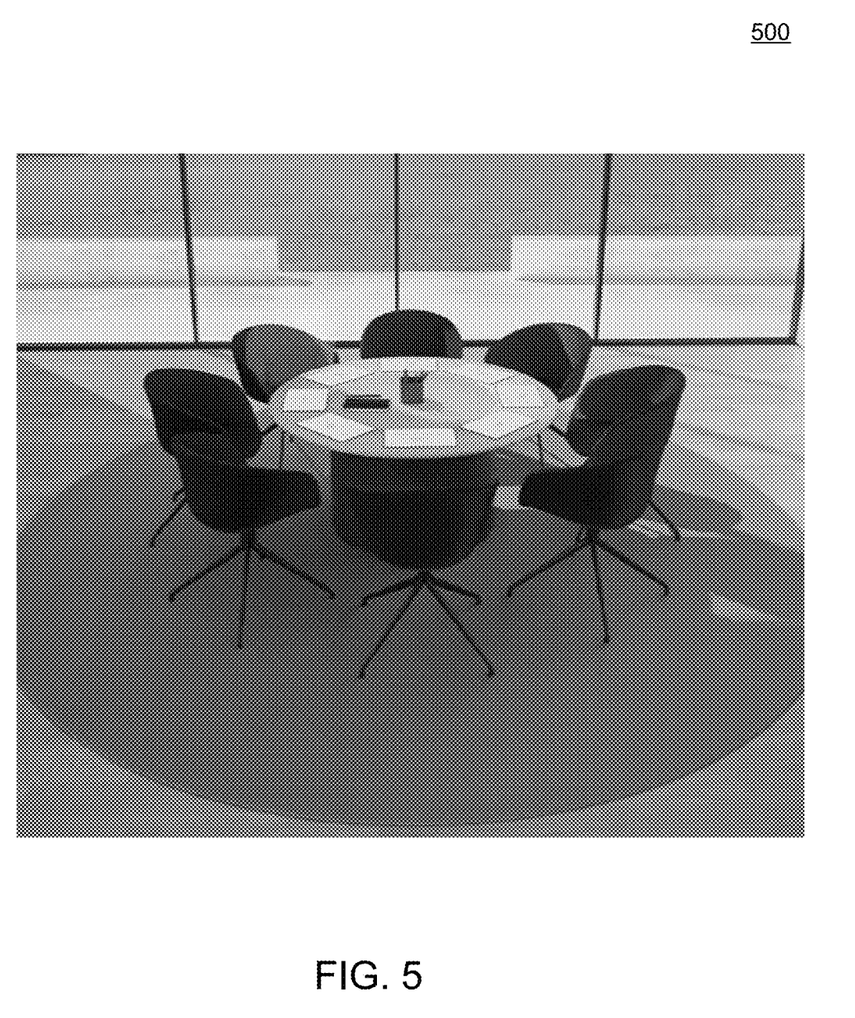
FIG. 5 is a screenshot diagram of another instance of a virtual event GUI in the context of a conference room.
Figure 6:
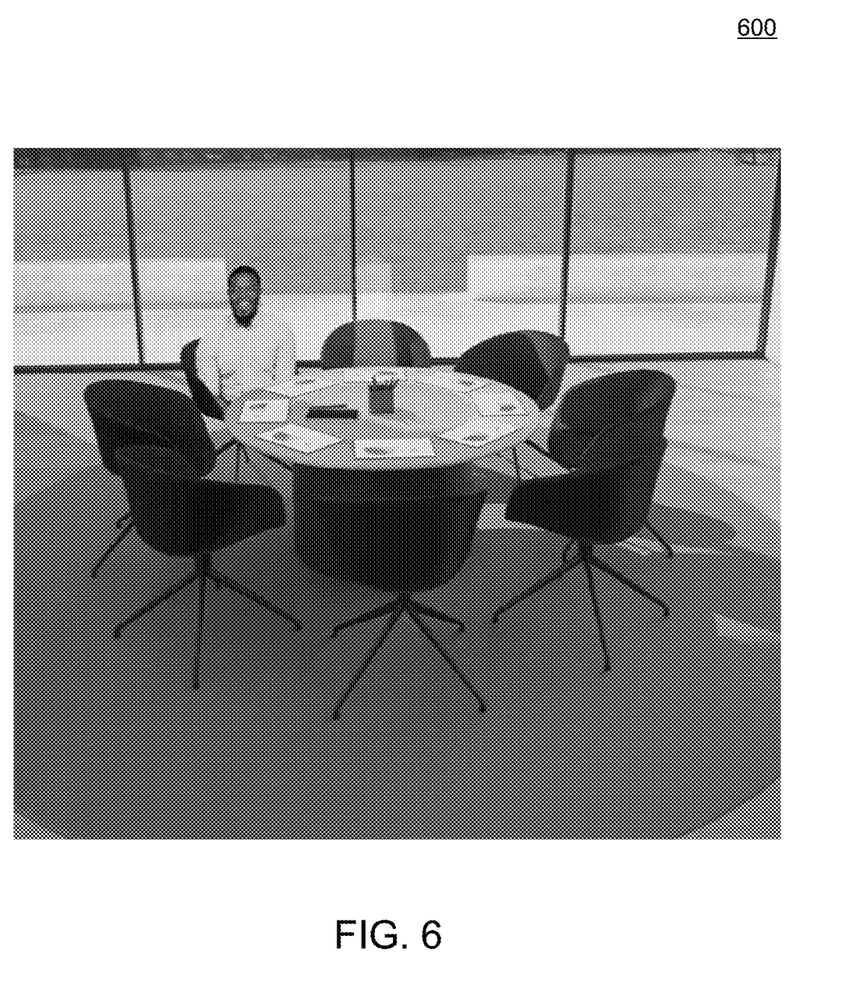
FIG. 6 is a screenshot diagram of another instance of a virtual event GUI in the context of a conference room with one member.
Figure 7:
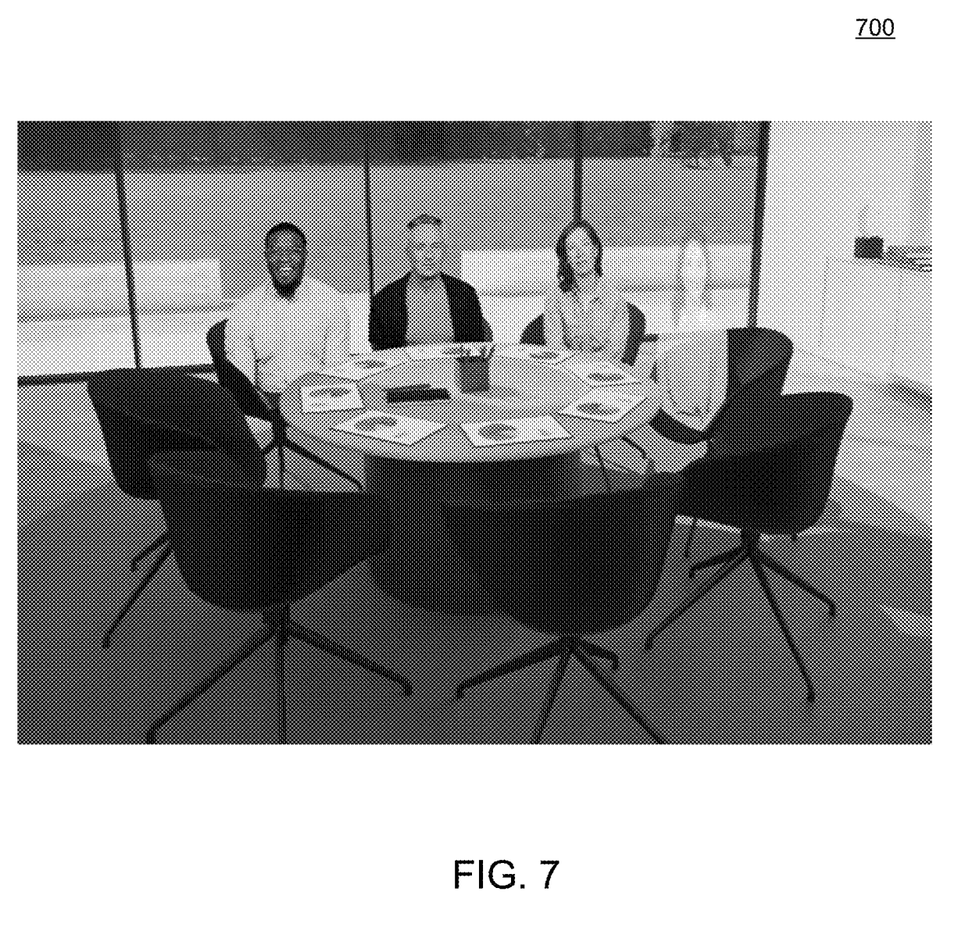
FIG. 7 is a screenshot diagram of another instance of a virtual event GUI in the context of a conference room with three members.

FIG. 5 shows another instance of a virtual event GUI 500 displaying a conference room. This is also a group and, as can be seen, has initially no members present in the room. FIG. 6 shows another instance of a virtual event GUI 600 displaying a conference room with one member. FIG. 7 shows another instance of a virtual event GUI 700 displaying a conference room with three members. There is a semi-transparent user graphical representation of a fourth member of the group, which represents a user that is just entering the virtual environment. As can be seen, as the members accept the invitation, the group membership grows. The virtual event is a conference, taking place in the conference room. It is a 3D virtual environment wherein participants or members of the group are represented within the 3D virtual environment as camera-generated user graphical representations of themselves.

By grouping the participants into groups of similar interests or backgrounds and facilitating communication with each other, systems and methods of the current disclosure thus provides the participants the chance to meet and mingle with each other individually more easily. This makes it easier for participants to meet people with similar interests and to network. Even though these virtual events can be attended by a large number of participants that are generally strangers to each, the proposed systems and methods provide the participants a better opportunity to network and build up new business or other relations with each other.

As can be seen in FIG. 1 a storage unit 115 records audio/video content from the virtual event and other related data to allow the participants to play back and review the virtual event at a later time. For example, where the virtual event is a lecture in the field of electronics such as in a classroom environment, a participant may play back portions of the event to review discussions among other participants or answers to questions which were posed to the lecturer during the event.

While the embodiment described above relies on a central server 100 providing virtual event 110 to establish connections between client devices and to stream video and audio between the client devices, the underlying principles of the disclosure are not limited to this particular implementation. For example, in one embodiment, the client devices are configured to establish peer-to-peer connections with one another, either without a central server (e.g., using a peer-to-peer networking protocol), or using a central server solely as a directory server, to lookup the network addresses of the other clients participating in the virtual event. In addition, in this embodiment, the client devices establish direct connections with one another to exchange video and audio of the participants.

In some embodiments, to ensure a responsive user interface, local updates, in response to input from the local participant, is applied immediately. For example, in response to the participant on a client device selecting and holding the queue key, the participant is instantly placed in the speaker queue and/or place in the center speaker region (if the participant is first in the queue). Thus, the state update will be instantly reflected in the graphical user interface of the participant, resulting in a positive user experience.

In some embodiments, when utilizing 3D virtual environments, such as the 3D virtual environments 500-700 of FIGS. 5-7, the virtual environments utilize a hybrid system architecture, which includes a client-server side and a peer-to-peer (P2P) side. In an embodiment the client-server side comprises web or application servers. The client-server side may be further configured to include secure communication protocols; micro-services; a database management system; a database; and/or a distributed message and resource distribution platform. Server-side components may be provided along with the client devices that communicate to the servers through a network. The client-server side defines the interaction between the one or more clients and the server through the network, including any processing performed by a client side, a server side, or a receiving client side. In an embodiment, one or more of the corresponding clients and servers perform the necessary image and media processing according to various rule-based task allocation combinations. In an embodiment, the web or application servers are configured to receive client requests employing the secure communication protocols and process the client requests by requesting the micro-services or data corresponding to the requests from the database using a database management system. The micro-services are distributed utilizing a distributed message and resource distribution platform using a publish-subscribe model.

The P2P side comprises a P2P communication protocol enabling real-time communication between client devices in the virtual environment; and a rendering engine configured to enable the client device to perform real-time 3D rendering of live session elements therein included (e.g., user graphical representations) in the virtual environment. An example of a suitable P2P communication protocol may be a Web Real-Time Communication (WebRTC) communication protocol, which is collection of standards, protocols, and JavaScript APIs, which, in combination, enable P2P audio, video, and data sharing between peer client devices. An example of a suitable rendering engine may be 3D engines based on WebGL, which is a JavaScript API for rendering 2D and 3D graphics within any compatible web browser without the use of plug-ins, allowing accelerated usage of physics and image processing and effects by one or more processors of the client device (e.g., one or more graphic processing units (GPUs)). In an embodiment, the P2P side further includes a computer vision library configured to enable the client device to perform real-time computer vision tasks in the virtual environment. An example of a suitable computer vision library may be OpenCV, which is a library of programming functions configured mainly for real-time computer vision tasks. Using such a hybrid model of communication may enable rapid P2P communications between users reducing latency problems while providing web services and resources to each session, enabling a plurality of interactions between users and with content in the virtual environment. The level and ratio of usage of the client-server side with respect to the P2P side may depend on one or more of the amount of data to be processed, the latency permitted to sustain a smooth user experience, the desired quality of service (QOS), the services required, or the like.

Figure 8:
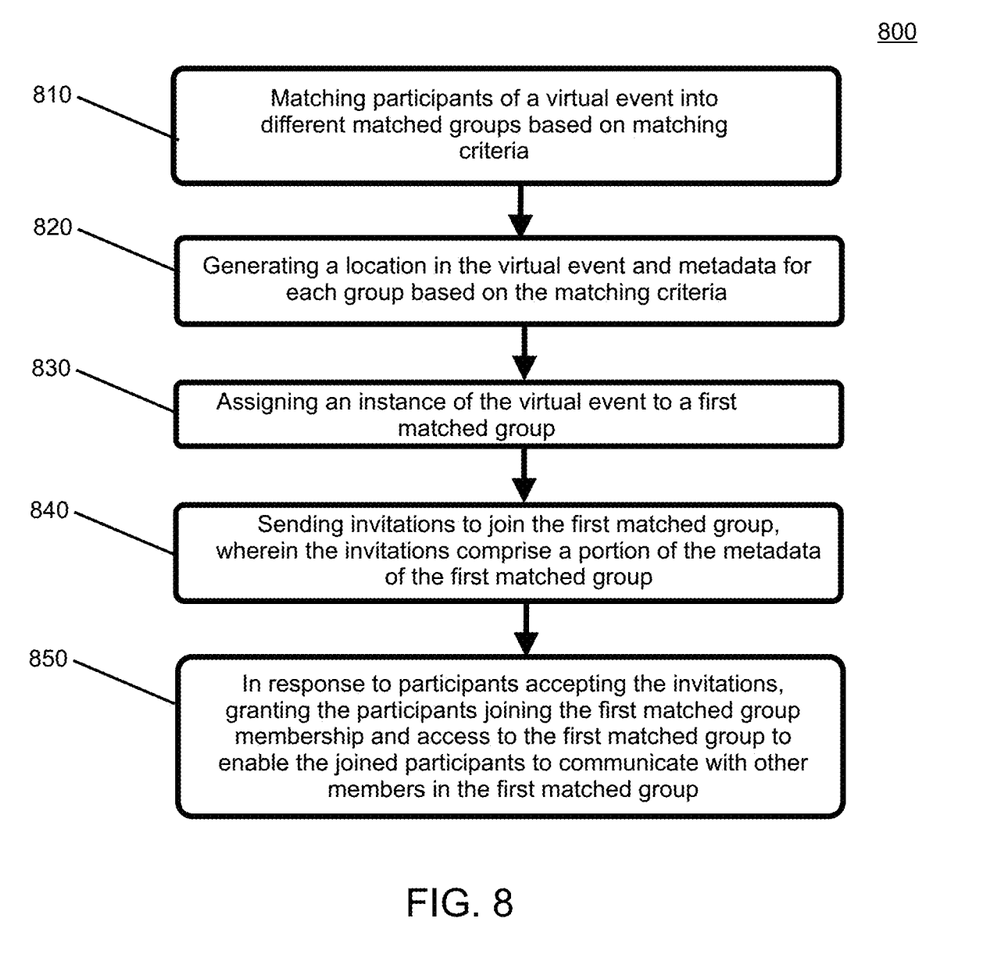
FIG. 8 is a flowchart diagram of a method of matchmaking for a virtual event, according to an embodiment.

FIG. 8 shows a method 800 of matchmaking for a virtual event. The method 800 begins in step 810 by matching participants of the virtual event into different matched groups based on matching criteria. In some embodiments, the virtual event is hosted in a virtual environment within memory of at least one computing device. The matching criteria may be included in registration data of participants of the virtual event in a registration module linked to the virtual environment. In step 820, the method proceeds by generating a location in the virtual event and metadata for each group based on the matching criteria and, in step 830, by assigning an instance of the virtual event to each group. In step 840, the method proceeds by sending invitations to participants to join the matched group. In some embodiments, the invitations comprise a portion of the metadata of the first matched group, e.g., by encoding the metadata within a URL. In step 850, the method continues by, in response to participants accepting the invitations to join the group (e.g., by clicking on or otherwise activating a URL in the invitation), granting each participant joining the group membership and access to the matched group. This enables the joined participants to communicate with other members in the matched group.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

The invention claimed is:

1. A system for a virtual event comprising:
a computer system comprising one or more computing devices having at least one processor and memory storing registration data of participants of a virtual event hosted in a virtual environment, the registration data comprising one or more matching criteria, the computer system being programmed to perform steps comprising:
matching the participants into different matched groups based on the matching criteria;
generating a location in the virtual event and metadata for each of the matched groups based on the matching criteria;
assigning an instance of the virtual event to a first matched group;
sending invitations to join the first matched group, wherein the invitations comprise a portion of the metadata of the first matched group; and
in response to participants accepting the invitations to join the first matched group, granting the participants joining the first matched group membership and access to the first matched group to enable the joined participants to communicate with other members in the first matched group.

2. The system as in claim 1, wherein the access that is granted to the participant joining the group comprises enabling audio and video access.

3. The system as in claim 1, wherein the first matched group can contact other matched groups.

4. The system as in claim 1, wherein the metadata of the first matched group comprises the matching criteria for the first matched group.

5. The system as in claim 1, wherein the matching criteria of the first matched group comprises at least one of a topic criterion, a betting criterion, a game choice, a media interest, a social relationship, a brand interest, or an age group.

6. The system as in claim 1, wherein the matching criteria for the first matched group comprises a geolocation and distance in the real world between participants in the first matched group.

7. The system as in claim 1, wherein one or more properties of the scene in the virtual event of each matching group are customized to match at least one of the matching criteria.

8. The system as in claim 7, wherein the properties of the scene in the virtual environment comprise the visual design of the selected location, the audio of the selected area, applications available in the location of the virtual environment, or a combination thereof.

9. The system as in claim 1, wherein the remote computer system is further programmed to enable users to search for relevant groups based on the matching criteria.

10. The system as in claim 1, wherein the virtual environment is a 3D virtual environment, and wherein the participants are represented within the 3D virtual environment as camera-generated user graphical representations of themselves.

11. The system as in claim 1, wherein the virtual event is a 2D virtual event, and wherein the participants are represented within a 2D virtual environment as avatars that, when selected, spawn a video conference enabling communication with other participants.

12. The system as in claim 1 wherein the virtual event comprises a speaker queue.

13. The system as in claim 1, wherein the computer system is further programmed to position matched participants of the first matched group closer to each other based on a higher matching relevance score, and to position matched participants of the first matched group farther to each other based on a lower matching relevance score.

14. A system for virtual events comprising:
a remote computer system comprising one or more computing devices having at least one processor and memory storing registration data of participants of a virtual event hosted in a virtual environment, the registration data comprising matching criteria, the computer system being programmed to perform steps comprising:
assigning at least one of the matching criteria to each of a plurality of locations in the virtual event;
matching the participants to a matched location of the plurality of locations in the virtual event based on the matching criteria;
assigning an instance of the virtual event to the matched location based on the matching criteria;
sending invitations to the matched participants to join the matched location, wherein the invitations comprise a part of the metadata of the matched location;
in response to the participants accepting the invitations to join the matched location, granting the participants joining the matched location access to the matched location of the virtual event, spawning the participant directly in the matched location and enabling the joined participants to communicate with other participants in the matched location.

15. A method comprising, by a computer system comprising one or more computing devices having at least one processor and memory:
registering registration data of participants of a virtual event in a registration module linked to a virtual environment, the registration data of participants of the virtual event comprising one or more matching criteria;
matching the participants into different matched groups based on the matching criteria;
generating a location in the virtual event and metadata for each matched group based on the matching criteria;
assigning an instance of the virtual event to a first matched group;
sending invitations to join the first matched group;
in response to participants accepting the invitations to join the first matched group, granting the participants joining the first matched group membership and access to the first matched group to enable the joined participants to communicate with other members in the first matched group.

16. The method as in claim 15, wherein the metadata of the first matched group comprises at least the matching criteria for the first matched group.

17. The method as in claim 15, wherein the matching criteria of the first matched group comprises at least one of a topic criterion, a betting criterion, a game choice, a media interest, a social relationship, a brand interest, and an age group.

18. The method as in claim 15, wherein the matching criteria for the first matched group comprises distance in the real world between participants in the first matched group.

19. A non-transitory computer-readable medium with instructions which, when executed by at least one processor, trigger a computer system to perform the steps comprising:
registering registration data of participants of a virtual event in a registration module linked to a virtual environment, the registration data of participants of the virtual event comprising one or more matching criteria;
matching the participants into different matched groups based on the matching criteria;
generating a location in the virtual event and metadata for each of the matched groups based on the matching criteria;
assigning an instance of the virtual event to a first matched group;
sending invitations to join the first matched group;
in response to participants accepting the invitations to join the first matched group, granting the participants joining the first matched group membership and access to the first matched group to enable the joined participants to communicate with other members in the first matched group.

20. The non-transitory computer-readable medium of claim 19, wherein the matching criteria for the first matched group comprises a geolocation and distance in the real world between participants in the first matched group.

* * * * *